United States Patent [19]

Emig, Jr.

[11] Patent Number: 5,344,278
[45] Date of Patent: Sep. 6, 1994

[54] APPARATUS FOR RAISING AND MOVING AN OPEN ENDED CONTAINER

[76] Inventor: Howard Emig, Jr., 2524 Mark Dr., Mesquite, Tex. 75150

[21] Appl. No.: 7,575

[22] Filed: Jan. 22, 1993

[51] Int. Cl.⁵ .............................................. B66F 9/18
[52] U.S. Cl. .................. 414/622; 187/9 R; 187/17; 294/119.2
[58] Field of Search ........... 414/621, 622, 607, 608, 414/592, 448, 420–422; 187/9 R, 17; 294/119.2, 31.2, 103.1

[56] References Cited

U.S. PATENT DOCUMENTS

| | | | |
|---|---|---|---|
| 1,584,569 | 5/1926 | Cochran | 414/622 X |
| 2,598,515 | 5/1952 | Dickson | 414/622 |
| 3,388,820 | 6/1968 | Lebre | 187/9 R X |
| 3,587,892 | 6/1971 | Vermette | 414/420 |
| 3,851,777 | 12/1974 | Dilny | 414/607 |
| 4,213,727 | 7/1980 | Lighthipe, Jr. | 414/420 |
| 4,692,084 | 9/1987 | Persson | 187/9 R X |
| 4,741,659 | 5/1988 | Berg | 414/622 X |
| 4,940,381 | 7/1990 | Rysewyk | 187/9 R X |
| 5,207,550 | 5/1993 | Lehman | 414/607 X |

FOREIGN PATENT DOCUMENTS 2032385 5/1980 United Kingdom ............... 414/621

OTHER PUBLICATIONS

Drum Carrier brochure, undated.

*Primary Examiner*—David A. Bucci
*Attorney, Agent, or Firm*—Harry C. Post, III

[57] ABSTRACT

Apparatus for raising and moving an open ended container, which comprises a base structure. Moving apparatus is connected to the base structure for rolling the base structure over a substantially level surface. Raising apparatus is connected to the base structure for raising the open ended container in a substantially vertical manner above the substantially level surface. Container support apparatus is connected to the raising apparatus for supporting the container in an upright position while being raised and rolled over the substantially level surface.

17 Claims, 5 Drawing Sheets

APPARATUS FOR RAISING AND MOVING AN OPEN ENDED CONTAINER

TECHNICAL FIELD

This invention relates to apparatus for raising and moving an open ended container and, more particularly, to apparatus for raising and moving an open ended container with the container in a substantially vertical position.

BACKGROUND ART

In the printing industry, it is well known that containers, such as metal drums, are used to support heavy liquids, such as ink or other petroleum based products.

When the liquid is used a single container is provided and is opened. A pump is mounted to the wall to the container and the liquid pumped from the container for use at the appropriate location, such as inking apparatus on a printing machine. Although the container may be located near an initial location where the liquid is being used, frequently the container is relocated to another location a substantial distance from the initial location, such as occurs when inking apparatus are being supplied with ink at different printing machines. Prior to this invention, the pump is removed from the container, the container is covered again by the container's lid, and a two-wheeled dolly is used to move the closed container to the new location. It is necessary to remove the pump and recover the container because the container is supported on and moved with the two-wheeled dolly, which rotates the container around its wheels. This allows the liquid in an open container to splash out of the container when rotated to a moving position and rolled to the new location.

Accordingly, it is an object of the present invention to provide apparatus for raising and moving an open ended container.

Further, it is an object of the present invention to provide apparatus for raising and moving an open ended container in a substantially vertical position.

Further, it is an object of the present invention to provide apparatus for raising and moving an open ended container without the need for covering the container.

Further, it is an object of the present invention to provide apparatus for raising and moving an open ended container even when the containers have a diameter that varies between the containers.

DISCLOSURE OF THE INVENTION

In accordance with the present invention there is provided apparatus for raising and moving an open ended container, which comprises a base structure. Moving apparatus is connected to the base structure for rolling the base structure over a substantially level surface. Raising apparatus is connected to the base structure for raising the open ended container in a substantially vertical manner above the substantially level surface. Container support apparatus is connected to the raising apparatus for supporting the container in an upright position while being raised and rolled over the substantially level surface.

BRIEF DESCRIPTION OF THE DRAWINGS

Other objects and advantages of the invention will become apparent upon reading the following detailed description and upon reference to the drawings, wherein like reference characters are used throughout to designate like parts.

BEST MODE FOR CARRYING OUT THE INVENTION

Figure 1:
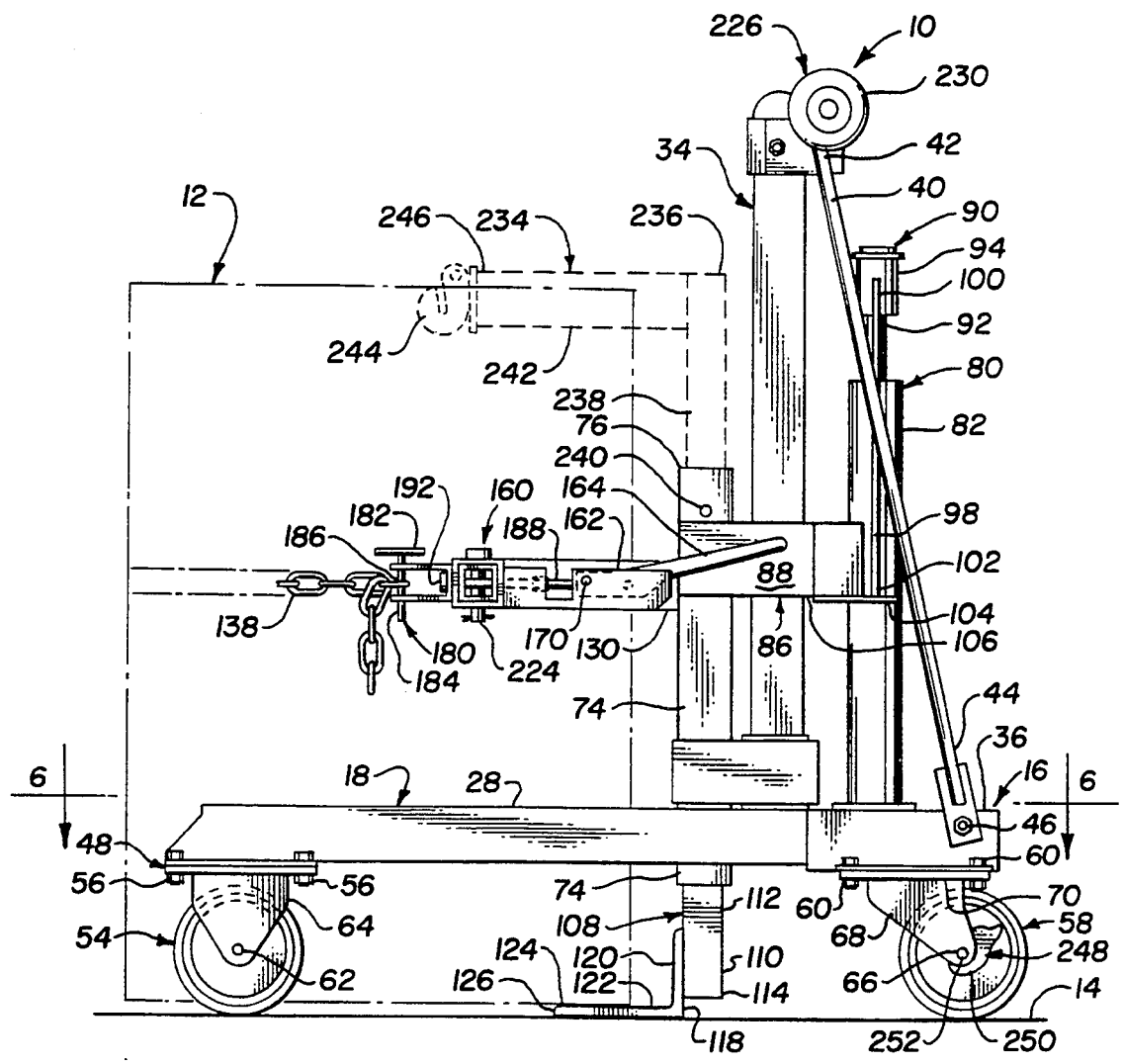
FIG. 1 is a side view in elevation of apparatus for raising and moving an open ended drum constructed in accordance with the present invention prior to lifting the drum.

Turning now to the FIGS. 1–3 and 6, there is shown apparatus 10 for raising and moving an open ended drum or other container 12 over a substantially level support surface 14.

In apparatus 10 there is a base structure 16 that includes a generally U-shaped member 18, which forms a plane extending generally parallel to substantially level surface 14. U-shaped member 18 has an elongated base 20 with first and second ends 22 and 24, respectively. A first arm 26 is connected to first end 22 of base 20 and a second arm 28 is connected to second end 24 of base 20. Each arm 26 and 28 has an outboard end 30 and 32, respectively. Ends 30 and 32 are disposed apart from one another by a distance sufficient to allow drum 12 to be received between first and second arms 26 and 28, respectively. First and second arms 26 and 28 are elongated with a length sufficient for outboard ends 30 and 32 to extend past the center of gravity of container 12, and are disposed to extend substantially parallel to one another so as to provide stability when moving apparatus 10.

An elongated support post 34 is included in base structure 16 and is connected to elongated base 20 substantially equidistant between first and second ends 22 and 24. Support post 34 extends in a substantially perpendicular direction relative to substantially level surface 14 directed upwardly and away from U-shaped member 18.

A support platform 36 is included in base structure 16 with a planar surface lying in the plane formed by generally U-shaped member 18. Platform 36 is connected to base 20 substantially equidistant between first and second ends 22 and 24 and is disposed to extend away from base 20 in a direction opposite to which arms 26 and 28 of U-shaped member 18 extend.

First and second tie back rods 38 and 40, respectively, are included in base structure 16. A rod is disposed on each side of elongated support post 34 to aid in supporting and providing stability to elongated post 34. Each rod 38 and 40 has an upper end 42 connected in a conventional fashion to elongated support post 34 and a lower end 44 connected by bolts 46 to opposed sides of support platform 36.

Rolling apparatus 48 is connected to base structure 16 for rolling base structure 16 over substantially level surface 14. Rolling apparatus 48 includes a first conventional wheel apparatus 50 connected by bolts 52 to the underneath side of outboard end 30 of first arm 26, a second conventional wheel apparatus 54 connected by bolts 56 to the underneath side of outboard end 32 of second arm 28, and a conventional wheel apparatus 58 connected by bolts 60 to the underneath side of support platform 36. To provide stability when moving apparatus 10 over surface 14, rolling apparatus 48 provides a three point rolling support relative to surface 14. First and second conventional wheel apparatus 50 and 54, respectively, are rotatably connected by an axle 62 to a fixed inverted U-shaped mounting bracket 64 to limit movement of base structure 16 in a direction parallel to the direction in which arms 26 and 28 are pointing. Third conventional wheel apparatus 58 is rotatably connected by an axle 66 to an inverted U-shaped mounting bracket 68, which is pivotally connected at 70 to the underneath side of support platform 36 to allow turning movement of base structure 16 relative to surface 14.

A raising apparatus 72 is connected to base structure 16 for raising open ended container 12 in a substantially vertical manner above substantially level surface 14. Included in raising apparatus 72 is an elongated tubular lifting member 74 with an upper end 76 and a lower end 78. A conventional hydraulic jack 80, such as the 1½ ton jack sold by The Guardian of Waukesha. Wis., with Model No. 231, is included in raising apparatus 72 and is used to move elongated tubular lifting member 74 upwardly of substantially level support surface 14. Jack 80 has a cylinder 82 that supports a quantity of hydraulic liquid connected to support platform 36 of base structure 16. Disposed within cylinder 82 is a ram that moves laterally away from and toward cylinder 82. A pumping handle 84 provides pressure to the liquid in cylinder 82 to move the ram in the lateral movement.

A sleeve member 86 is connected to elongated tubular lifting member 74 between upper and lower ends 76 and 78, respectively, and is adapted to movably circumscribe that portion of elongated support post 34 disposed beneath portion 88 of sleeve member 86 surrounding post 34.

A connecting apparatus 90 is used in raising apparatus 72 to secured an upper end 92 of the ram to sleeve member 86. Connecting apparatus 90 includes a cap 94 that is connected to upper end 92 of the ram, first and second securing rods 96 and 98, respectively, each rod 96 and 98 having an upper end 100 attached to cap 94 at diametrically opposed sides of upper end 92 of the ram and a lower end 102.

An urging member 104 is connected to lower end 102 of each rod 96 and 98 and is extends from lower end 102 of each rod 96 and 98 to engage a shoulder 106 disposed along the lower edge of sleeve member 86. When pumping handle 84 is moved, open ended container 12 is selectively raised and lowered in a substantially vertical direction above substantially level surface 14.

Figure 2:
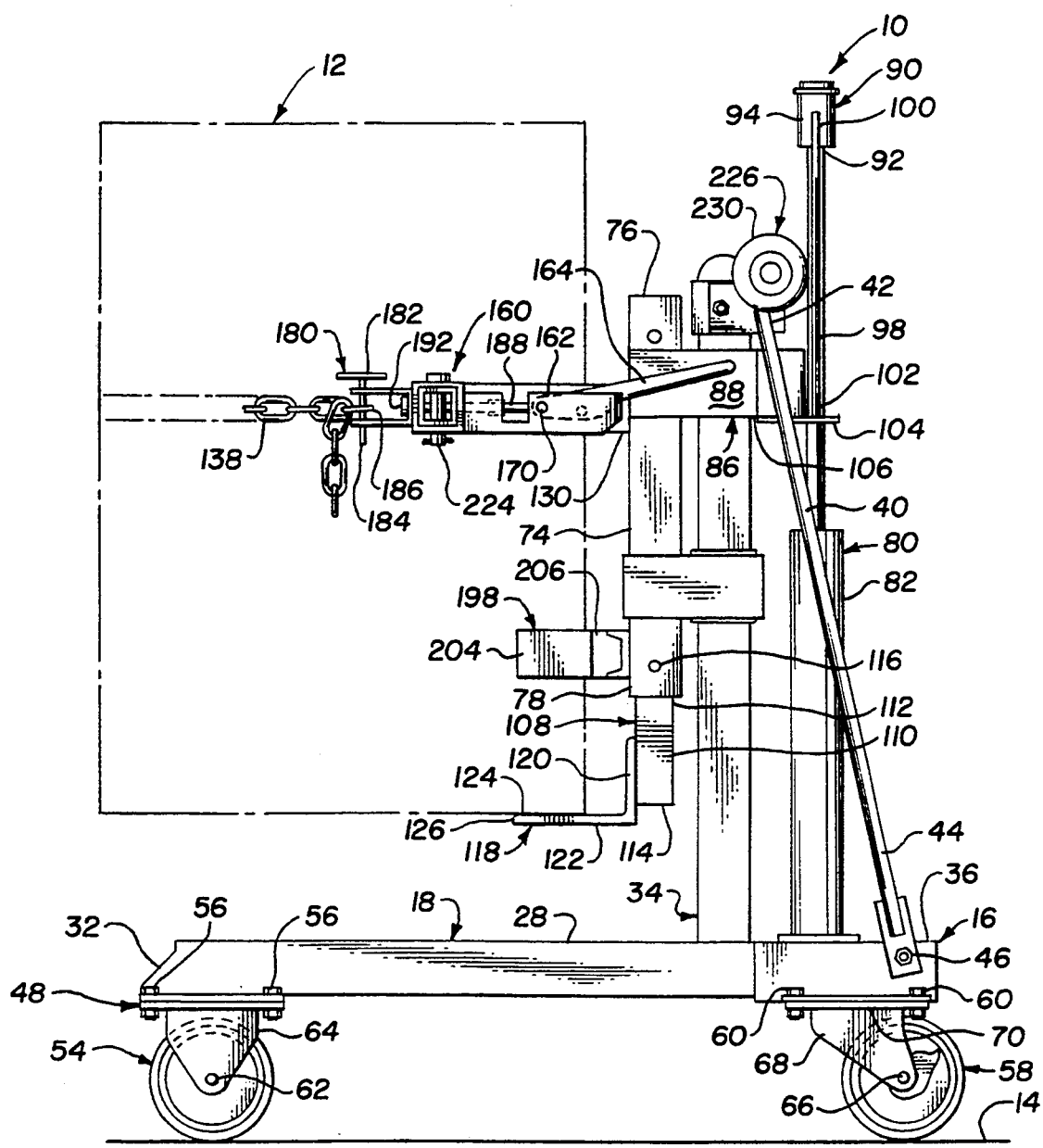
FIG. 2 is a side view in elevation of the apparatus shown in FIG. 1 after the drum is lifted.

As seen in FIGS. 1 and 2, a drum support apparatus 108 for supporting drum 12 is connected to raising apparatus 72. Drum support apparatus 108 has a tubular member 110 with an upper end 112 adapted to be complimentarily inserted into lower end 78 of tubular lifting member 74 and a lower end 114. A connecting pin 116 detachably connects upper end 112 of tubular member 110 to lower end 78 of tubular lifting member 74. An L-shaped member 118 is connected to lower end 114 of tubular member 110. L-shaped member 118 has a vertical extension 120 to provide a backstop to drum 12 and a horizontal extension 122 being sufficiently thin to permit movement beneath drum 12 and sufficiently thick to support drum 12 above substantially level support surface 14. Horizontal extension 122 has an edge 124 with a tapered shoulder 126 to assist in permitting movement of horizontal extension 122 beneath drum 12.

An adjustable drum securing apparatus 128 is connected to raising apparatus 72 for securing drum 12 to raising apparatus 72 to prevent drum 12 from tipping over when being raised and moved. Adjustable securing apparatus secures each drum 12 even though such drum varies vary in diameter from the previous drum that was lifted and moved. Adjustable drum securing apparatus 128 includes a tubular tying bracket 130. Tying bracket 130 has an elongated body 132 with a length sufficient to extend outwardly of each side of the largest drum to be secured and terminating in first and second outboard ends 134 and 136, respectively. Apparatus 128 is also included a relatively inelastic flexible member 138, such as a conventional metal chain, with a length sufficient to extend between first and second outboard ends 134 and 136, respectively, while encircling largest diameter drum to be secured, as shown in dotted outline in FIG. 3.

Figure 3:
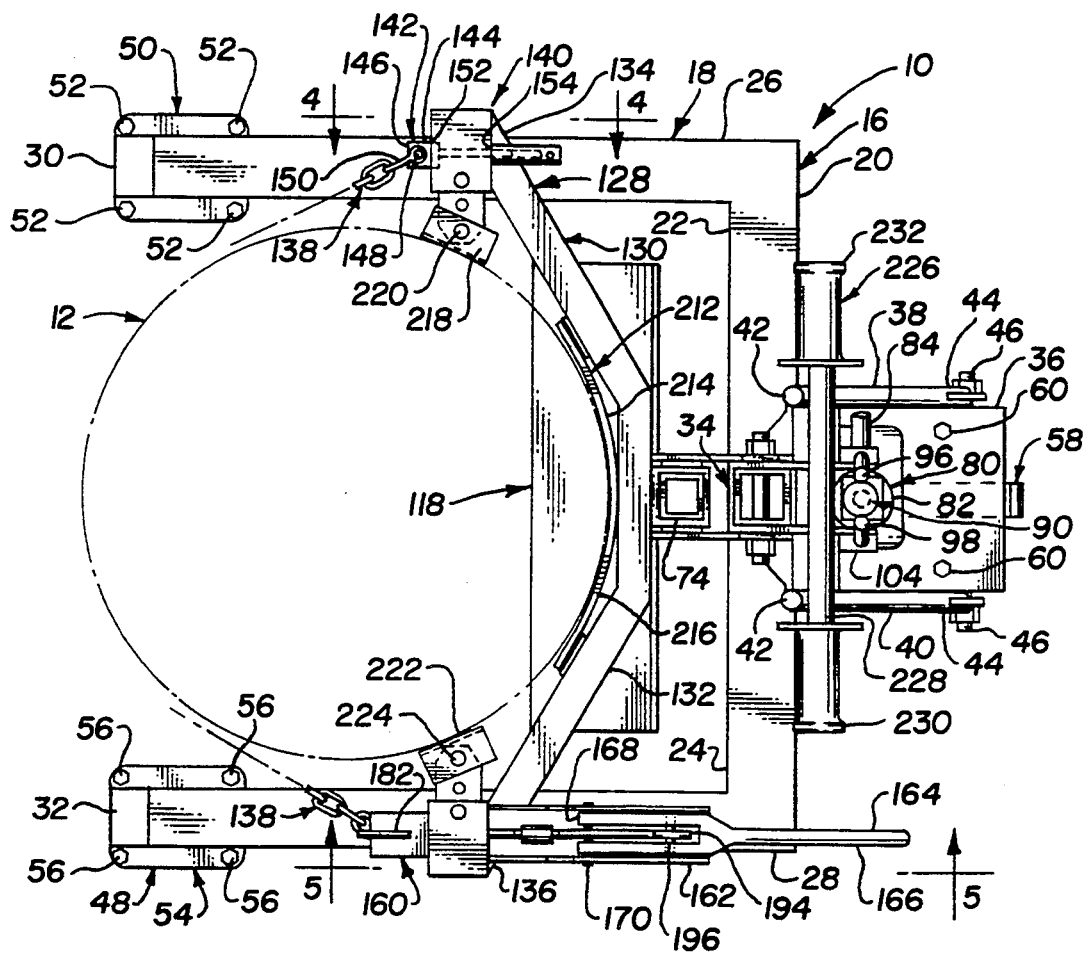
FIG. 3 is a plane view of the apparatus shown in FIG. 1.
Figure 4:
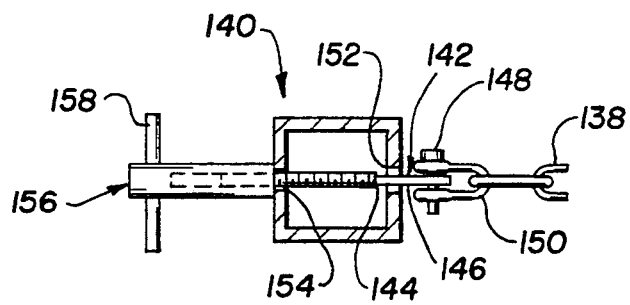
FIG. 4 is a view, partly in cross-section, of a portion of the apparatus shown in FIG. 3, taken along the lines in the direction of arrows 4—4.
Figure 6:
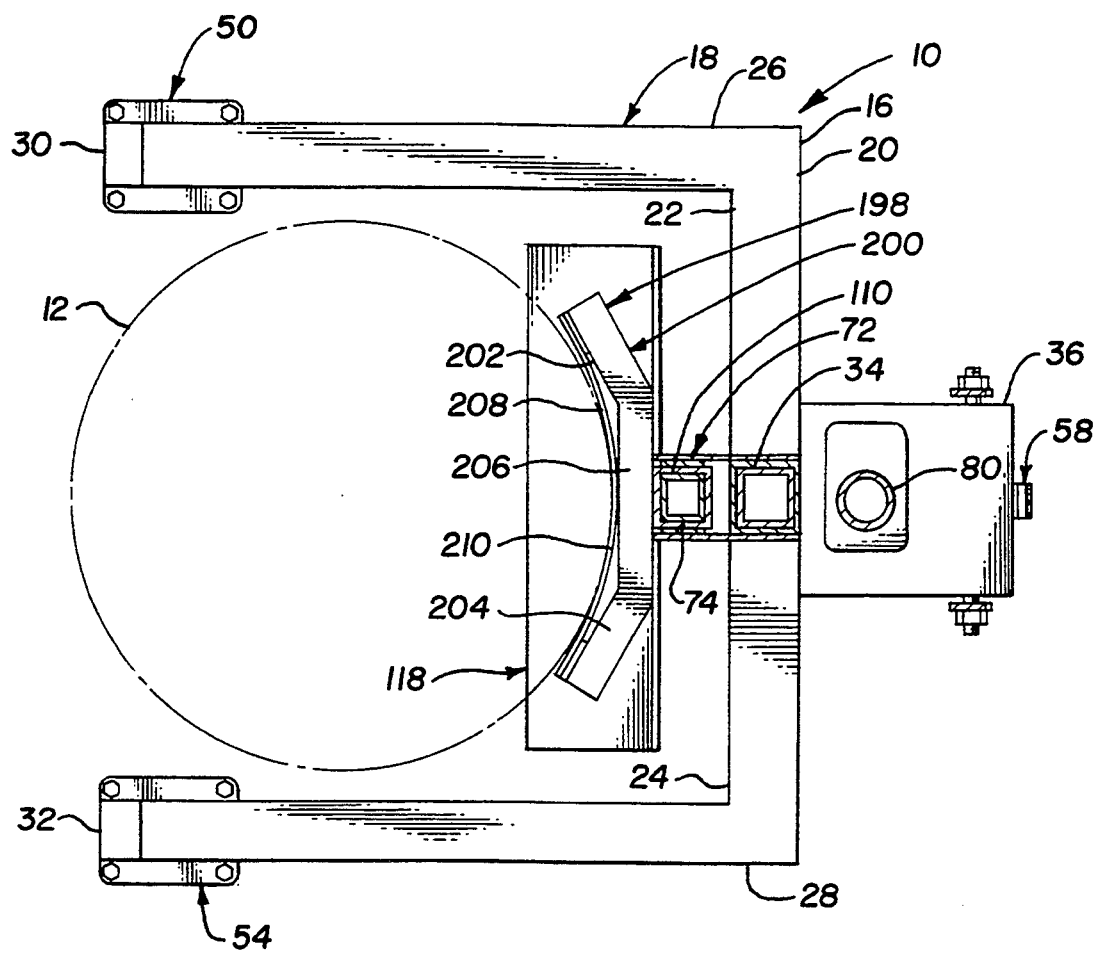
FIG. 6 is a view, partly in cross-section, of a portion of the apparatus shown in FIG. 1, taken along the lines in the direction of arrows 6—6.

As best seen in FIGS. 3-4 and 6, attached to first outboard end 134 of tubular tying bracket 130 is a first outboard end securing apparatus 140. First outboard end securing apparatus 140 has an elongated screw device 142 with an end 144 secured to one end of flexible member 138 by securing plate 146 connected by a pin 148 to a U-shaped member 150 and with a length sufficient for passing through aligned holes 152 and 154 in tubular tying bracket 130 and for extending across the walls of the tube of bracket 130 forming a portion of tubular tying bracket 130.

A cap nut 156 is threadedly secured to screw device 142 on the side of tubular tying bracket 130 away from flexible member 138 to permit minor adjustment for variations in diameter size of each drum 12 when nut 156 is tightened against bracket 130. A cross-member 158 is provided with nut 156 to permit tightening of flexible member 138.

Figure 5:
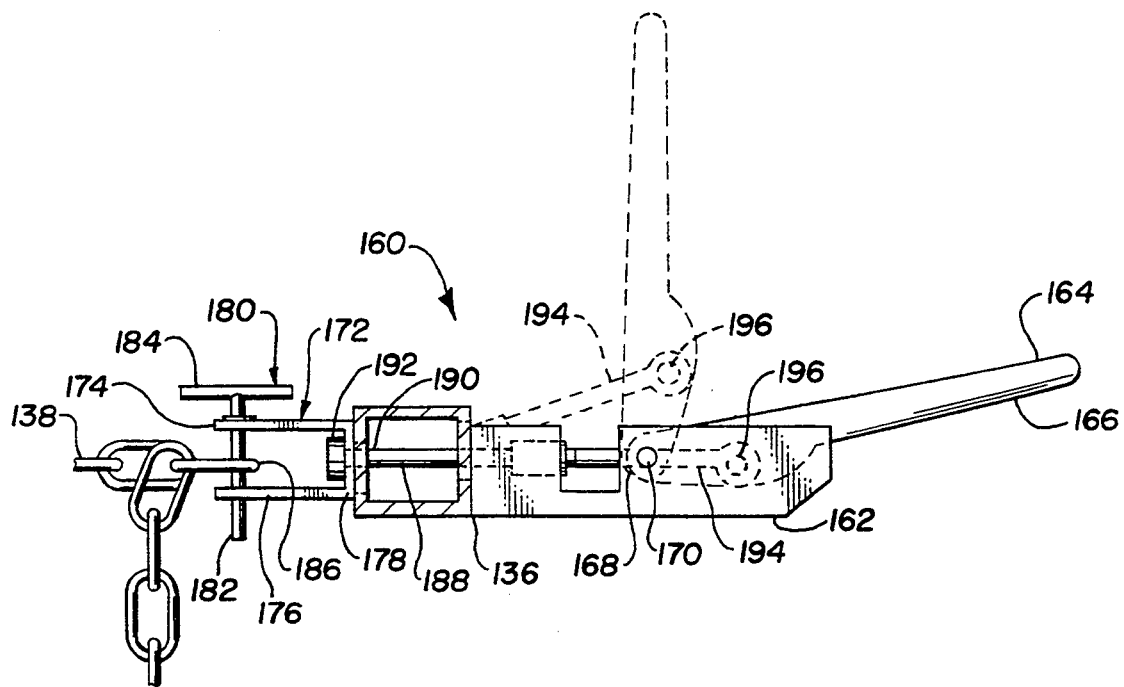
FIG. 5 is a view, partly in cross-section, of a portion of the apparatus shown in FIG. 3, taken along the lines in the direction of arrows 5—5.

As best seen in FIGS. 1-4 and 6, attached to second outboard end 136 of tubular tying bracket 130 is a second outboard end securing apparatus 160. Second outboard end securing apparatus 160 has a connecting bracket 162 secured to second outboard end 136 of tubular tying bracket 130. A connecting handle 164 has a handle end 166 and a connected end 168 pivotally connected by pin 170 to connecting bracket 162. A U-shaped connecting bracket 172 with two parallel arms 174 and 176 that extend from a base 178. A connecting T-pin 180 has a handle 182 and an extending member 184 that extends across parallel arms 174 and 176 and through an opening in flexible member 138, such as that formed by a link 186 in chain 138. A connecting rod 188 has one end 190 connected to base 178 of U-shaped connecting bracket 172 by a nut 192 threadedly connected to rod 188 and another end 194 pivotally connected by a pin 196 to connecting handle 164 between handle end 166 and pivotally connected end 168 such that drum 12 is secured against tubular tying bracket 130 by rotating connecting handle 164 around pin 170 into a locked position, shown in solid outline in FIGS. 1-5, from an unlocked position, shown in dotted outline in FIG. 5.

As best seen in FIGS. 1-3 and 6, a lower drum bracing apparatus 198 for assisting in supporting the drum is connected to lower end 78 of elongated tubular lifting member 74 of raising apparatus 72. Lower drum bracing apparatus 198 includes a drum brace member 200 connected to elongated tubular lifting member 74 included in raising apparatus 72. Drum brace member 200 is composed of three linear members with first and second outer portions 202 and 204, respectively, and a middle portion 206 interconnecting first and second outer portions. A first contact plate 208 for engaging drum 12 is included in lower drum bracing apparatus 198 and is connected to drum brace member 200. First contact plate 208 has a curved planar body 210 to engage drum 12 with the curve generally coinciding with the largest diameter drum 12 to be secured and a length that extends from the outer edge of first outer portion 202 to the outer edge of second outer portion 204 and completely across middle portion 206 of drum brace member 200.

As best seen in FIGS. 1-3, an upper drum bracing apparatus 212 is connected to tubular tying bracket 130 to assist in supporting drum 12. Upper drum bracing apparatus 212 includes a second contact plate 214 for engaging drum 12 connected to elongated body 132 for tubular typing bracket 130. Second contact plate 214 has a curved planar body 216 to engage drum 12 with approximately the same curve and length as first contact plate 208. A first support member 218 for engaging drum 12 is connected to first outboard end securing apparatus 140 by a pin 220. A second support member 222 for engaging drum 12 is connected to second outboard end securing apparatus 160 by pin 224. When locking handle 164 is rotated into the locked position, drum 12 is urged against curved body 216, first support member 218 and second support member 222 so that drum 12 is securely fastened to apparatus 10.

A control handle assembly 226 is secured to elongated support post 34 of base structure 16 to control the direction of movement of base structure 16. Control handle assembly 226 includes a handle bar 228 connected to elongated support member 34 of base structure 16. A left and right grip 230 and 232, respectively, are disposed on each end of handle bar 228.

As best seen in FIG. 1, a hanger apparatus 234 is detachably connected to upper end 76 of elongated tubular lifting member 74. Hanger apparatus 234 includes an inverted generally L-shaped member 236 with one leg 238 of the L being adapted to be inserted into upper end 76 of elongated tubular lifting member 74 to extend substantially perpendicular to surface 14 and secured to lifting member 74 by pin 240. The other leg 242 of the L is disposed to extend away from elongated support post 34 in a direction substantially parallel to surface 14 and substantially equidistant between first and second arms 26 and 28, respectively, of base structure 16. A hook 244 is attached to outboard end 246 of other leg 242 of L shaped member 236. Hook 244 has an opening of such size so as to receive a bail from a smaller container.

A wheel locking apparatus 248 is connected to caster 58 of rolling apparatus 48 to prevent rolling movement of base structure 16 when moved into a locked position. Wheel locking apparatus 248 includes a wedge member 250 that is pivotally connected to all axle 252 of caster 58 for selectively pivoting into a locked position, shown in FIG. 1, and out of engagement with the caster into an unlocked position.

In operation, a drum 12 is stood on end on surface 14. Apparatus 10 is rolled into position with first and second arms 26 and 28, respectively, positioned on each side of drum 12 and horizontal extension 122 of L shaped member 118 slide beneath the bottom edge of drum 12. One end of flexible member 138 of adjustable connecting apparatus 128 fastened to first outboard end securing apparatus 140 and the other end of flexible member 138 fastened to second outboard end securing apparatus 160. When connecting handle 164 is rotated into the locked position, drum 12 is urged against lower drum bracing apparatus 198 and upper drum bracing apparatus 212. Should flexible member 138 be too loose or too tight against drum 12, such tension may be adjusted by removing connecting pin 180 of second outboard end connecting apparatus 160 from engagement with flexible member 138 and the point of connect adjusted to provide the correct tension in flexible member 138. For fine adjustment, winged nut device 156 in first outboard end securing apparatus may be rotated to provide correct tension in flexible member 138. After drum 12 is secured by adjustable connecting apparatus 128 and drum support apparatus 108 to base structure 16, the upper end of drum 12 may be opened and access be provided to the liquid supported in drum 12. When moving the open ended drum 12, pump handle 84 is moved to cause cap 94 connected to hydraulic jack 80 to be raised, which lifts drum 12 is a substantially vertical direction above surface 14 and base structure 16 moved to the new location by an individual grasping grips 230 and 232 and pushing on handle bar 228. Upon arriving at the new location, the pressure in cylinder 82 of hydraulic jack 80 is released and drum 12 is lowered to surface 14.

The invention having been described, what is claimed is:

1. Apparatus for raising and moving an open ended container, comprising: a base structure; moving means connected to said base structure for rolling the base structure over a substantially level surface; raising means connected to said base structure for raising the open ended container in a substantially vertical manner above the substantially level surface; container support means connected to said raising means for supporting the container in an upright position while being raised and rolled over the substantially level surface; and an adjustable container securing means connected to said raising means for securing the open ended container to said raising means to prevent the container from tipping over when being raised and moved, said adjustable container securing means including a tying bracket having an elongated body with a length sufficient to extend outwardly of each side of the largest container to be secured and terminating in first and second outboard ends, and a relatively inelastic flexible member having a length sufficient to extend between the first and second outboard ends while encircling the largest diameter container to be secured, and a second outboard end securing apparatus having a connecting bracket secured to the second outboard end of the tying bracket, a connecting handle having a handle end and a connected end pivotally connected to the connecting bracket, a U-shaped connecting bracket with two parallel arms extending from a base, a connecting pin disposed to extend between the two parallel arms and through an opening in the flexible member, a connecting rod with one end connected to the base of the U-shaped connecting bracket and another end pivotally connected to the connecting handle between the handle end and the pivotally connected end such that the container is secured against the tying bracket by rotating the connecting handle into a locked position.

2. Apparatus as set forth in claim 1, further comprising: said adjustable container securing means further including a first outboard end securing apparatus having an elongated screw device with an end secured to one end of the flexible member and a nut device threadedly secured to another end of the screw device on the side of the tying bracket away from the flexible member to permit minor adjustment for variations in diameter size of the container.

3. Apparatus for raising and moving an open ended container, comprising: a base structure; moving means connected to said base structure for rolling the base structure over a substantially level surface; raising means connected to said base structure for raising the open ended container in a substantially vertical manner above the substantially level surface; and container support means connected to said raising means for supporting the container in an upright position while being raised and rolled over the substantially level surface; said raising means including a tubular lifting member with upper and lower ends; and said container support apparatus including a tubular member adapted to be inserted into the lower end of the tubular lifting member.

4. Apparatus as set forth in claim 3, further comprising: said base structure including a generally U-shaped member having a base and first and second arms connected to the base, the first and second arm being disposed away from one another by a distance sufficient to allow the container to be received therebetween.

5. Apparatus as set forth in claim 4, further comprising: said moving means including a wheel rotatably connected to each outboard end of the first and second arms included in said base structure and a caster adapted to permit swivel and rotating movement of said base structure relative to the substantially level surface connected to said base structure.

6. Apparatus as set forth in claim 5, further comprising: a wheel locking apparatus connected to the caster included in said moving apparatus to prevent rolling movement of said base structure.

7. Apparatus as set forth in claim 6, further comprising: said wheel locking apparatus including a wedge member pivotally connected to an axle of the caster for selectively pivoting into and out of engagement with the caster.

8. Apparatus as set forth in claim 3, further comprising: said container support apparatus further including a pin adapted to secure the tubular member to the lower end of the tubular lifting member and an L-shaped member with an vertical extension to provide a backstop to the container and a horizontal extension being sufficiently thin to permit movement beneath the container and sufficiently thick to support the container above the substantially level support surface, the horizontal extension having an edge tapered to assist in permitting movement of the horizontal extension beneath the container.

9. Apparatus as set forth in claim 3, further comprising: hanger means detachably connected to the upper end of the elongated tubular lifting member.

10. Apparatus as set forth in claim 9, further comprising: said hanger means including an inverted generally L-shaped member with one leg of the L adapted to be inserted into the upper end of the elongated tubular lifting member and the other leg of the L extending away from the elongated support post, and a hook attached to an outboard end of the other leg of the L.

11. Apparatus as set forth in claim 3, further comprising: container bracing means connected to said raising means to assist in supporting the container.

12. Apparatus as set forth in claim 11, further comprising: said container bracing means including a container brace member connected to said raising means having first and second outer portions and a middle portion, a contact plate connected to the container brace member having a curved planar body to engage the container, the curve generally coinciding with the circumference of the container to be secured, and a length that extends from the outer edge of the first outer portion to the outer edge of the second outer portion and completely across the middle portion of the container brace member.

13. Apparatus for raising and moving an open ended drum over a substantially level support surface, comprising: a base structure including a generally U-shaped member having an elongated base with first and second ends, a first arm connected to the first end of the base and a second arm connected to the second end of the base, the first and second arms having an outboard end, the outboard ends being disposed away from one another by a distance sufficient to allow the drum to be received between the first and second arms, an elongated support post connected to the elongated base substantially equidistant between the first and second ends and disposed to extend in a substantially perpendicular direction away from the U-shaped member, a support platform connected to the base and disposed to extend away from the base in a direction opposite to which the arms of the U-shaped member extend, and a tie back rod disposed on each side of the elongated support post to aid in supporting the elongated support post, each rod being connected to the elongated support post and the support platform; rolling apparatus connected to said base structure for rolling said base structure over the substantially level surface, said rolling apparatus including a wheel rotatably connected to each of the outboard ends of the first and second arms included in said base structure and a caster adapted to permit swivel and rotating movement of said base structure relative to the substantially level surface connected to the support platform included in said base structure; raising apparatus for raising the open ended drum in a substantially vertical manner above the substantially level surface connected to said base structure, said raising apparatus including an elongated tubular lifting member with upper and lower ends, a hydraulic jack for moving the elongated tubular lifting member upwardly of the substantially level support surface including a cylinder supporting a quantity of liquid connected to the support platform of said base structure, a ram disposed within the cylinder for lateral movement away from and toward the cylinder, and a pumping handle for providing pressure to the liquid in the cylinder to move the ram in the lateral movement, and a sleeve member connected to the elongated tubular lifting member between the upper and lower ends and adapted to movably circumscribe a portion of the elongated support post, connecting apparatus for securing an upper end of the ram to the sleeve member including a cap connected to the upper end of the ram, first and second securing rods, each rod having an upper end attached to the cap at diametrically opposed sides of the ram and a lower end, and an urging member connected to the lower end of each rod and adapted to engage the sleeve member when the pumping handle is moved and selectively raise and lower the open ended drum substantially vertically above the substantially level surface; a drum support apparatus for supporting the drum connected to said raising apparatus, said drum support apparatus having a tubular member adapted to be inserted into the lower end of the tubular lifting member, a pin adapted to secure the tubular member to the lower end of the tubular lifting member and an L-shaped member with an horizontal extension to provide a backstop to the drum and a horizontal extension being sufficiently thin to permit movement beneath the drum and sufficiently thick to support the drum above the substantially level support surface, the horizontal extension having an edge tapered to assist in permitting movement of the horizontal extension beneath the drum; adjustable securing apparatus connected to said raising apparatus for securing various sized drums to said raising means to prevent the drum from tipping over when being raised and moved, said drum securing apparatus including a tubular tying bracket having an elongated body with a length sufficient to extend outwardly of each side of the largest drum to be secured and terminating in first and second outboard ends, a relatively inelastic flexible member having a length sufficient to extend between the first and second outboard ends while encircling the largest diameter drum to be secured, a first outboard end securing apparatus having an elongated screw device with an end secured to one end of the flexible member and passing through aligned holes in the tubular tying bracket and extending a cross a portion of the tubular tying bracket, a nut device threadedly secured to the screw device on the side of the tubular tying bracket away from the flexible member to permit minor adjustment for variations in diameter size of the drum, and a second outboard end securing apparatus having a connecting bracket secured to the second outboard end of the tubular tying bracket, a connecting handle having a handle end and a connected end pivotally connected to the connecting bracket, a U-shaped connecting bracket with two parallel arms extending from a base, a connecting pin disposed to extend between the two parallel arms and through an opening in the flexible member, a connecting rod with one end connected to the base of the U-shaped connecting bracket and another end pivotally connected to the connecting handle between the handle end and pivotally connected end such that the drum is secured against the tubular tying bracket by rotating the connecting handle into a locking position; a lower drum bracing apparatus connected to said raising apparatus to assist in supporting the drum, said drum bracing apparatus including a drum brace member connected to the elongated tubular lifting member included in said raising apparatus having first and second outer portions and a middle portion, a first contact plate for engaging the drum connected to the drum brace member having a curved planar body to engage the drum, the curve generally coinciding with the largest diameter drum to be secured and a length that extends from the outer edge of the first outer portion to the outer edge of the second outer portion and completely across the middle portion of the drum brace member; an upper drum bracing apparatus connected to said tubular tying bracket to assist in supporting the drum, said upper drum bracing apparatus including a second contact plate for engaging the drum connected to the drum brace member having a curved planar body to engage the drum with approximately the same curve and length as the first contact plate, a first support member for engaging the drum connected to the first outboard end securing apparatus, and a second support member for engaging the drum connected to the second outboard end securing apparatus; a control handle assembly secured to the elongated support post of said base structure for controlling movement of said base structure, said control handle assembly including a handle bar connected to the elongate support member included in said base structure and a grip disposed on each end of the handle bar; a hanger apparatus detachable connected to the upper end of the elongated tubular lifting member, said hanger apparatus including an inverted generally L-shaped member with one leg of the L adapted to be inserted into the upper end of the elongated tubular lifting member and the other leg of the L extending away from the elongated support post in a direction disposed between the first and second arms of said base structure, and a hook attached to an outboard end of the other leg of the L; and a wheel locking apparatus connected to the caster included in said rolling apparatus to prevent rolling movement of said base structure, said wheel locking apparatus including a wedge member pivotally connected to an axle of the caster for selectively pivoting into and out of engagement with the caster.

14. Apparatus for raising and moving an open ended container, comprising: a base structure including a base and an elongated support post connected to the base and disposed to extend in a substantially perpendicular direction away from the base; moving means connected to said base structure for rolling the base structure over a substantially level surface; raising means connected to said base structure for raising the open ended container in a substantially vertical manner above the substantially level surface; and container support means connected to said raising means for supporting the container in an upright position while being raised and rolled over the substantially level surface; said raising means including a lifting member, a hydraulic jack for moving the lifting member substantially vertically upwardly of the substantially level surface including a cylinder supporting a quantity of liquid connected to said base structure, a ram disposed within the cylinder for lateral movement away from and toward the cylinder, and a pumping handle for providing pressure to the liquid in the cylinder to move the ram in the lateral movement, and a sleeve member connected to the lifting member and adapted to movably circumscribe a portion of the support post.

15. Apparatus as set forth in claim 14, further comprising: said raising means further including connecting apparatus for securing an upper end of the ram to the sleeve member including a cap connected to the upper end of the ram, first and second securing rods, each rod having an upper end attached to the cap at diametrically opposed sides of the ram and a lower end, and an urging member connected to the lower end of each rod and adapted to engage the sleeve member when the pumping handle is moved and selectively raise and lower the open ended container substantially vertically above the substantially level surface.

16. Apparatus as set forth in claim 14, further comprising: said raising means further including the lifting member being tubular with upper and lower ends; and said container support means being connected to the lower end of the tubular lifting member included in said raising means.

17. Apparatus as set forth in claim 14, further comprising: said raising means further including the lifting member being tubular with upper and lower ends; and said container support means being connected to the upper end of the tubular lifting member included in said raising means.

* * * * *